Aug. 12, 1941.  W. BENZ  2,252,545
SYNCHRONIZER
Filed May 21, 1940  3 Sheets-Sheet 1
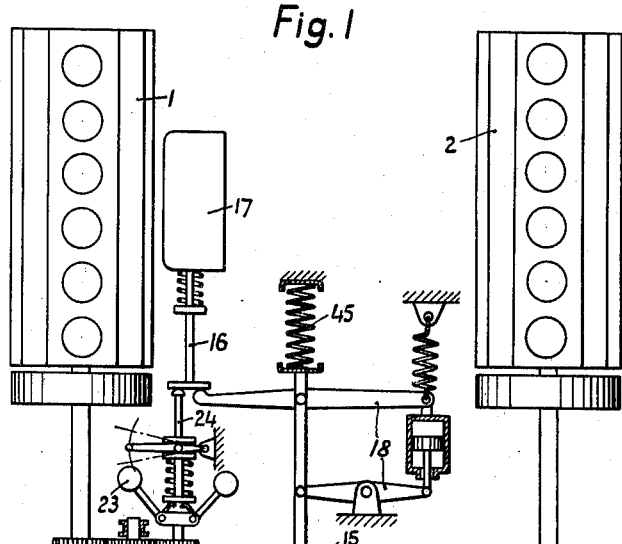
Fig. 1
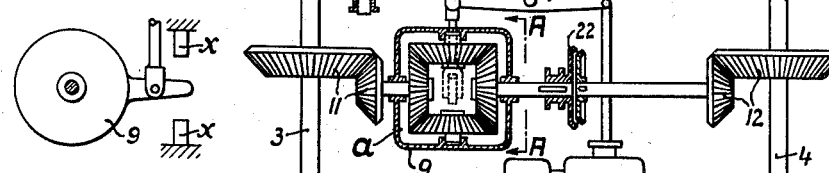
Fig. 2
Fig. 3
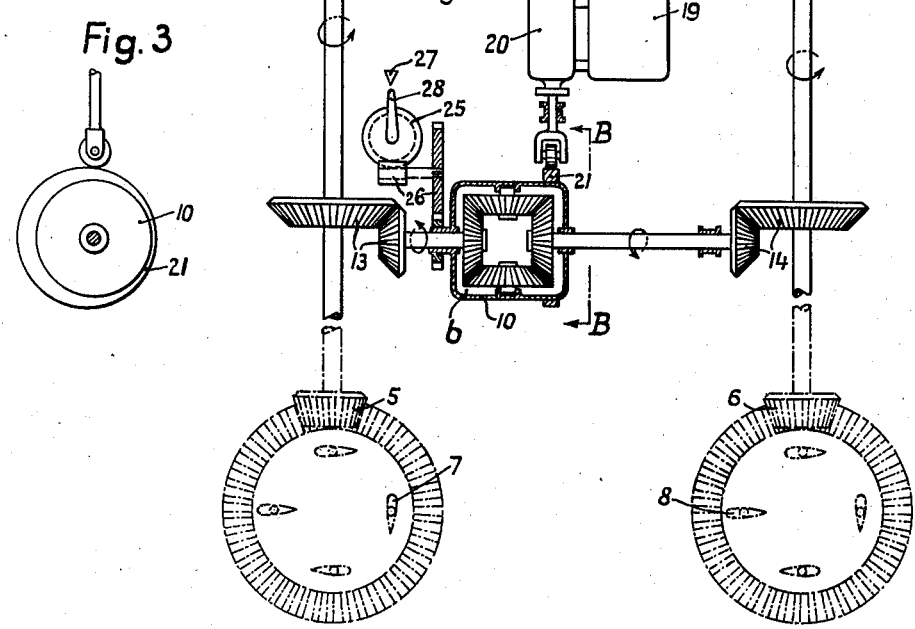
Inventor:
Walter Benz Aug. 12, 1941.    W. BENZ    2,252,545
SYNCHRONIZER
Filed May 21, 1940    3 Sheets-Sheet 3

Inventor:
Walter Benz

Patented Aug. 12, 1941

2,252,545

UNITED STATES PATENT OFFICE 2,252,545

SYNCHRONIZER

Walter Benz, Leverkusen-Schlebusch, Germany, assignor to Klöckner-Humboldt-Deutz Aktiengesellschaft, Cologne-Deutz, Germany, a corporation of Germany Application May 21, 1940, Serial No. 336,337
In Germany February 17, 1939

10 Claims. (Cl. 60—97)

The invention relates to a synchronizing device for power units, in which discrepancies between the angular movements of the shaft of one power unit and that of a pacemaker machine—usually a similar power unit—are used for varying the fuel supply to the synchronized power unit.

In many cases it is not sufficient that the rotary speed of the synchronized power unit corresponds with that of the pacemaker, but it is additionally necessary to maintain a definite angular relation of the shaft of the synchronized power unit and that of the pacemaker continuously. The latter is desired, for example, in plural screw ship's power units in which each screw is driven by a prime mover, because the vibration of the ship produced by the propeller blades has been found to be a minimum with certain relative angular positions of the screw shafts.

In accordance with the invention two phase indicators are provided showing the relative angular position of the shafts of the synchronized power unit and the pacemaker, which are connected through a differential mechanism to the fuel adjusting member of the synchronized power unit. One of the phase indicators controls the fuel feed, in known manner, in dependence upon the rate and direction of discrepancies between the angular movements of the shafts of the synchronized power unit and the pacemaker, while the other imparts additional adjustments to the fuel feed, through a servo-motor, as long as the instantaneous angular relation of the shafts is different from one or more predetermined angular relations.

The differential mechanism may comprise a differential lever, or, to give a greater range of adjustment, it may be a planetary gearing.

In the drawings are shown several embodiments of the invention.

Fig. 1 is a somewhat diagrammatic plan view of a synchronizing device with two phase indicators, for a ship's drive with two screws;

Fig. 2 is a vertical section on the line A—A of Fig. 1;

Fig. 3 is a vertical section on the line B—B of Fig. 1;

Figure 4:
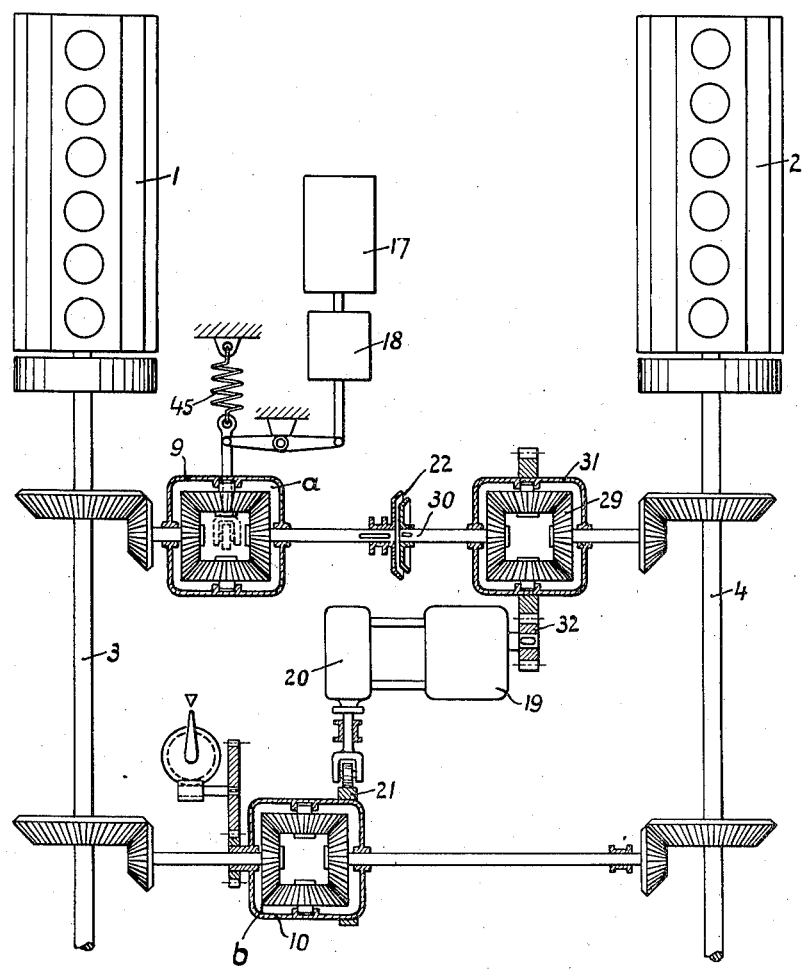
Fig. 4 is a diagrammatic plan view of another embodiment of the invention.

According to Fig. 1 internal combustion engines 1 and 2 drive the screws of the ship through shafts 3 and 4, respectively. During cruising running of the ship the ship's screws are required to run constantly at the same angular velocity and, in order to reduce to the smallest value vibrations caused by them, to maintain a definite angular relation to each other, which corresponds to this minimum value. In order to achieve this result one of the internal combustion engines, in this case the one designated 2, is made the pacemaker. This pacemaker machine controls the other internal combustion engine 1, through the regulating device now to be explained, in such a way that its shaft 3 has exactly the same rotary speed as the shaft 4 driven by the pacemaker machine 2, and retains a definite angular position with respect to the latter, selected with a view to reducing vibrations to a minimum.

The regulating device consists essentially of two phase indicators $a$ and $b$. As phase indicators, planetary differential mechanisms may be used, for example, the housings of which, 9 and 10, are not held stationary and the gears of which are driven in opposite directions by means of the bevel gears 11, 12 and 13, 14, by the pacemaker shaft 4 and the shaft 3 to be synchronized in speed and angular relation to it. The housings 9, 10, of the phase indicators serve as adjusting members for the fuel feed of the machine 1 in which is to be synchronized, because when the latter leads they turn in one direction and when it lags behind they turn in the opposite direction. The adjustment of the fuel feed is accomplished through a differential lever 15, to the fulcrum of which the fuel-adjusting member 16, for instance the regulating rod of the fuel pump 17, is connected, preferably through an inserted damping device 18. To one arm of the differential lever 15 is connected the adjusting member 9 of the phase indicator $a$. The rotary motion of the adjusting member 9 is limited by stationary stops X (Fig. 2), in accordance with the extent of movement of the fuel control member 16. The phase indicator $a$ therefore adjusts the fuel feed in accordance with the size and direction of discrepancies between the angular movements of the pacemaker 4 and the shaft 3 to be synchronized. To the other arm of the differential lever 15 is connected a servo-motor 19, the controlling valve 20 of which is operated by the adjusting member 10 of the phase indicator $b$, for example, by means of a cam 21 on the adjusting member (see Fig. 3). The cam 21 is so arranged that at a given angular relation of shafts 3 and 4 which produces the minimum vibration the control valve 20 is held in its middle position, so that the servo-motor is out of operation. It is so formed that when the adjusting member 10 turns in one direction, as a result of a deviation from a predetermined relative angular position of the shafts caused by a lagging of the shaft 3 with reference to the pacemaker shaft 4, the servo-motor 19 is set in operation by means of the control valve 20 in the direction to increase the fuel feed, and is kept in operation until the angular deviation has been made up by the resulting increase in rotary speed of the shaft 3; while, when the shaft 3 leads the shaft 4, causing the adjusting member 10 to turn in the opposite direction, the fuel feed is reduced until the angular deviation has been eliminated by the resulting reduction in the speed of the shaft 3. In place of the cam 21 a crank can also be provided on the adjusting member 10, which holds the control valve in its neutral position at a certain setting and, according to the direction of its departure from this setting, displaces the control valve in one direction or the other.

The regulating device is coupled and uncoupled by a friction clutch 22, which is so set that it slips as soon as the adjusting member 9 strikes against one of the abutments X. When the regulating device is cut out, an ordinary centrifugal governor 23 takes over the control of the speed of the motor 1. For this purpose the setting rod 24 of the centrifugal governor engages the fuel setting member 16. In order to provide an adjustment of the fuel feed without slack motion, the adjusting gear 15 and the phase indicator a are put under tension by a spring 45, which transmits its force through the differential transmitting mechanism 15 to the adjusting member 9.

*Operation.*—Before throwing in the regulating device the machine 1, which is to be synchronized, is brought up to a somewhat higher speed than the pacemaker machine 2, by compressing the governor spring of the centrifugal governor 3. Then simultaneously the clutch 22 and the pressure supply to the servo-motor 19 are thrown in. Since at this moment the shaft 3 is rotating faster than the shaft 4, the adjusting member 9 of the phase indicator a turns in counterclockwise direction (Fig. 2) and displaces the fuel control member 16, through the differential lever 15 and the damping device 18, in the direction to reduce the fuel feed. Thereby the speed of the machine 1 is immediately reduced and approaches that of the pacemaker machine 2. The speed regulator 23, adjusted to a higher speed, lowers its setting rod 24 from the fuel setting member 16 and thereby cuts itself out of the regulating process. As soon as the rotary speed of the machines 1 and 2 becomes identical, the reduction of the fuel feed is stopped by the return to rest of the adjusting member 9 of the phase indicator a. Now if the shafts 3 and 4 do not hold the definite angular relation to each other which produces the minimum vibration, but require, for instance, an additional forward movement of the shaft 3 through a certain angle, in order for it to assume the predetermined angular relation with respect to the pacemaker shaft 4, the setting member 10 of the phase indicator b assumes such a position that the cam 21 keeps the servo-motor 19 in operation in the direction to increase the fuel feed. This has the result that the machine 1 increases its speed over that of the pacemaker machine 2 and takes up the angular difference. Meanwhile, however, the adjusting members 9 and 10 of the phase indicators a and b turn. The adjusting member 10 turns the cam 21 toward the neutral position which stops the servo-motor 19 and which corresponds to the predetermined angular relation of the shafts 3 and 4, while the phase indicator a restores the increase in the fuel feed caused by the phase indicator b through the differential lever 15. As soon as the neutral position of the cam 21 is reached, the regulating procedure is finished. The machines 1 and 2 then run at the same speed and the shafts 3 and 4 are at the predetermined angular relation which produces the minimum vibration. Naturally the two regulating procedures do not take place successively as described, but simultaneously. The damping device 18 has the function of preventing oscillations during the regulation.

When a plurality of definite angular relations of shafts 3 and 4 produce a minimum vibration, a number of cam lobes corresponding to the number of these angular positions can be provided on the adjusting member 10 of the phase indicator b.

In order to reduce to the minimum, vibrations caused by the motors themselves, the couplings (not shown) between the crank shafts of the motors and the ship's screw shafts 3 and 4 are so arranged that not only the crank shafts of the motors 1, 2, but also the screws produce a minimum vibration at a predetermined relative angular position. The cam 21 on the adjusting member 10 of the phase indicator is then so arranged that it holds the control valve 20 in its neutral position at this preferred relative angular position. If, as indicated in dot and dash lines in Fig. 1, there are inserted driving gears 5, 6, between the ship's screws and the motors 1, 2—in the present example between the Voith-Schneider propellers 7, 8, and the motors 2—their driving ratio must naturally be taken into consideration. If it is assumed, for instance, that the driving ratio between the motors and the screws is 3:1 and that there is a most favorable relative angular position of the screws and also of the motor shafts, then the most favorable relative angular position of the screws corresponds to that of the motor shafts at intervals of three revolutions of one motor in excess of the other. Since the regulating device, in order to be as sensitive as possible, is preferably connected to the high speed side of the power plant, the most favorable angular relation of the shafts occurs at intervals of three rotations of the adjusting member 10 or cam 21 on the phase indicator b, if the transmission ratio of the gears 13, 14, of the phase indicator b is 1:2. Furthermore, it has to be considered that in order to provide a uniform wear of the teeth of the driving gears, one wheel should be made with one tooth more or less than it requires for a simple driving ratio. For example, if for producing a transmission ratio 1:3 the small wheel has 45 teeth and the large one, instead of 135, has only 134 teeth, then 134.3=402 revolutions of the adjusting member 10 are required before the preferred angle will be repeated. A gear transmission in the power line consequently has the result, that the regulating device only establishes and maintains the preferred angular position if it is thrown in exactly at that rotation of the adjusting member 10 when the most favorable angle of the motor shafts coincides with that of the screws. Now in order to identify the correct instant for coupling the clutch 22, the phase indicator b drives an indicating device 25, whose pointer 28 is so operated by a gear drive 26, that it executes one revolution while the adjusting member 10 of the phase indicator executes the number of revolutions comprising the interval at which the preferred angle of the motor shaft and the screws will be repeated. In addition there is on the indicating device a stationary mark 27 arranged so that the pointer 28 coincides with it at the instant when the preferred relative angular position occurs. The engineer now only has to throw in the clutch 22 at that moment when the indicator 28 is passing by the mark 27. If there are a plurality of favorable angular relations of the motor shaft and screws, the indicating device either has a corresponding number of stationary marks, or is driven at a smaller ratio corresponding to the number of preferred relative angular positions, so that the pointer 28 executes one complete revolution between each of these relative angular positions.

The differential lever 15 can be replaced by a planetary gearing 29, as shown in Fig. 4. The differential mechanism 29 is inserted in the line of shaft 30 of the phase indicator a and the housing 31 of the latter is turned in one direction or another by servo-motor 19 through gear 32, according to the position of cam 21. The rotation of the housing 31 is transmitted through the gears of the differential mechanism 29 and of the phase indicator a to the adjusting member 9 of the latter and from there through the damping device 18 to the fuel pump 17. The turning of adjusting member 9 caused by differences in rotary speed of shafts 3 and 4 is added to that produced by the differential mechanism 31, if the alteration of rotary speed of the shafts 3 required to produce synchronism must take place in the same direction as that for producing the required angular relation of shafts 3 and 4. It is subtracted from the turning produced by the differential housing 31, if the alteration of rotary speed of shaft 3 required for producing synchronism and that required for producing the preferred relative angular position must take place in opposite directions. The rotary motion of adjusting member 9 is so limited, in the same manner as shown in Fig. 2, that it can make no greater movement than that required for a maximum adjustment of the fuel setting member. The spring 45 serves for pre-tensioning the phase indicator a, in order to eliminate play in the gears. The power plant shown in Fig. 4 corresponds in other respects in construction and manner of operation with that shown in Fig. 1.

Figure 5:
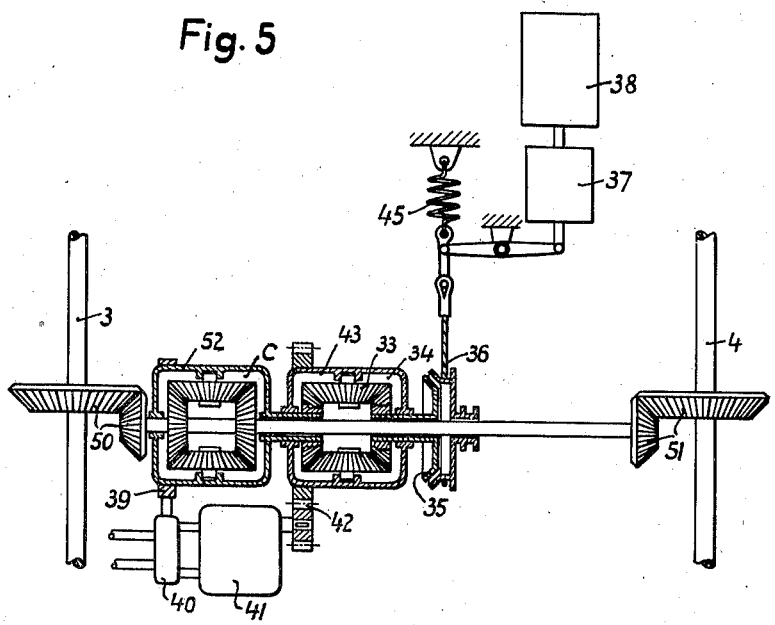
Fig. 5 is a diagrammatic plan view of still another embodiment utilizing a single phase indicator.

In Fig. 5 is shown a regulating device which has, instead of two phase indicators, only one. The phase indicator c is again a planetary gearing, the wheels of which are driven through gears 50, 51, in opposite directions by the shafts 3 and 4 of the machine to be synchronized and the pacemaker. The housing 52 is the adjusting member of the phase indicator. It is connected to the adjusting member of the fuel pump 38 through wheels 33 of a differential mechanism 34, friction clutch 35, cable drive 36, and a damping device 37. Thereby it controls directly the fuel feed in dependence upon the size and direction of discrepancies between the angular movements of the synchronized shaft 3 and the pacemaker shaft 4. In addition, the adjusting member 52 has a cam 39, which holds the control valve 40 of servo-motor 41 in the neutral position, exactly like cam 21 in Figs. 1 and 4, when the shafts 3 and 4 have a predetermined relative angular position, which produces the minimum vibration. This cam, according to the direction of deviation from the predetermined relative angular position of the shafts, causes a forward or backward turning of the servo-motor and holds this until the shafts 3 and 4 have again assumed the predetermined relative angular position. The servo-motor 41 turns the housing 43 of differential mechanism 34 through the gear 42 and thereby brings about an additional adjustment of the fuel pump 38, acting through the wheels 33, the friction clutch 35, the cable drive 36, and the damping device 37. This additional adjustment is either added to or subtracted from that caused by the adjusting member 52, according to whether the change in rotary speed of shaft 3 for the purpose of producing synchronism must take place in the same direction or in the opposite direction to that required for restoring the shafts 3 and 4 to the predetermined relative angular position. The adjusting member 52 therefore takes over directly and simultaneously the functions of the phase indicators b of the embodiments shown in Figs. 1 and 4.

Figure 6:
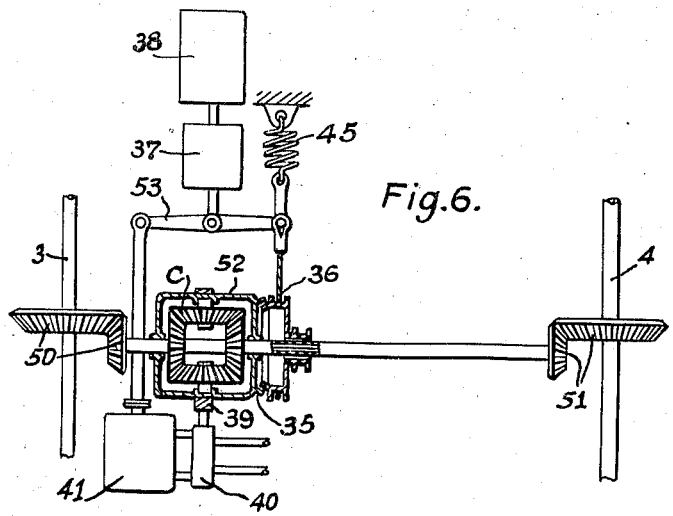
Fig. 6 is a diagrammatic plan view of a slightly modified form of the invention.

In place of the differential mechanism 34 there can naturally be used a differential lever 53 as shown in Fig. 6, like the differential lever 15 of Fig. 1. The adjusting member 52 of the phase indicator c is then connected through a friction clutch 35 and cable drive 36 to one end of the differential lever 53, while the servo-motor 41, in the form of a reciprocating motor, is connected to the other end of the differential lever. The indicating device is driven by the adjusting member 52, as in the embodiment shown in Fig. 1. The spring 45 again serves to pre-tension the phase indicator, in order to eliminate slack in the gears.

The synchronizing device is naturally not limited to ship's drives, but is suitable for all power plants in which separately driven shafts must be held continuously at the same rotary speed and at one or more predetermined angular positions with respect to each other.

I claim:

1. In a device for synchronizing shafts driven by separate prime movers at least one of which has a speed-changing device, means geared to both said shafts comprising an actuating member movable in dependency upon the size and direction of any discrepancies between the angular movements of said shafts, means geared to both said shafts comprising an actuating member movable in accordance with the direction of any deviations of the instantaneous relative angular positions of said shafts from one or more predetermined relative angular positions, means for compounding the movements of said actuating members, and means for transmitting the compounded movement to said speed-changing device.

2. In a device for synchronizing shafts driven by separate prime movers at least one of which has a speed-changing device, means geared to both said shafts comprising an actuating member movable in dependency upon the size and direction of any discrepancies between the angular movements of said shafts, means geared to both said shafts comprising an actuating member movable in accordance with the direction of any deviations of the instantaneous relative angular positions of said shafts from one or more predetermined relative angular positions, a servo-motor having a control member operated by said second actuating member, means for compounding the movement of said servo-motor with the movement of said first actuating means, and means for transmitting the compounded movement to said speed-changing device.

3. In a device for synchronizing shafts driven by separate prime movers at least one of which has a speed-changing device, a differential mechanism connected to said speed-changing device, two phase indicators each geared to both of said shafts and operatively connected with said differential mechanism, one of said phase indicators being adapted to adjust said speed-changing device through said differential mechanism in dependency upon the size and direction of any discrepancy between the angular movements of said shafts, the other of said phase indicators being adapted to adjust said speed-changing device through said differential mechanism in dependency upon the direction of any deviation of the instantaneous relative angular position of said shafts from one or more predetermined angular positions.

4. In a device for synchronizing shafts driven by separate prime movers at least one of which has a speed-changing device, a differential mechanism connected to said speed-changing device, a phase indicator geared to both of said shafts and operatively connected with said differential mechanism, said phase indicator being adapted to adjust said speed-changing device through said differential mechanism in dependency upon the size and direction of any discrepancy between the angular movements of said shafts, a servo-motor connected to said differential mechanism and having a control member, a second phase indicator geared to both said shafts comprising an actuating member movable in accordance with the direction of any deviation of the instantaneous relative angular position of said shafts from one or more predetermined relative angular positions, said actuating member being adapted to operate said servo-motor control member and thereby, through said differential mechanism, to impart a secondary adjustment to said speed-responsive device until, by suitable modification the speed of the prime mover having said speed-changing device, said shafts are restored to one of said predetermined relative angular positions and said servo-motor control member is returned to neutral position.

5. In a device for synchronizing shafts driven by separate prime movers at least one of which has a speed-changing device, two phase indicators each having driving means geared to both said shafts, a planetary differential mechanism inserted in the driving connections of one of said phase indicators, a servo-motor geared to said planetary differential mechanism, operative connections whereby said servo-motor is controlled by said second phase indicator, and connections between said first phase indicator and said speed-changing device; said first phase indicator being adapted, independently of said differential mechanism to adjust said speed-changing device in dependency upon the size and direction of any discrepancy between the angular movements of said shafts; said second phase indicator being adapted to control said servo-motor to impart a secondary adjustment to said speed-changing device, through said differential mechanism and said first phase indicator, so long as there is any deviation of the instantaneous relative angular position of said shafts from one or more predetermined relative angular positions.

6. In a device for synchronizing shafts driven by separate prime movers at least one of which has a speed-changing device, a differential mechanism, operative connections between said differential mechanism and said speed-changing device, a phase indicator geared to both of said shafts, and two parallel lines of connections between said phase indicator and different parts of said differential mechanism, one of said lines of connections being adapted to transmit adjustments from said phase indicator to said speed-changing device in dependency upon the size and direction of any discrepancy between the angular movements of said shafts, the other line of connections including a servo-motor adapted to impart a secondary adjustment to said speed-changing device so long as there is any deviation of the instantaneous relative angular position of said shafts from one or more predetermined relative angular positions.

7. In a device for synchronizing shafts driven by separate prime movers at least one of which has a speed-changing device, means geared to both said shafts comprising an actuating member movable in dependency upon the size and direction of any discrepancies between the angular movements of said shafts, a phase indicator geared to both said shafts including a cam movable in opposite directions in accordance with the direction of any deviation of the instantaneous relative angular position of said shafts from one or more predetermined relative angular positions, a servo-motor having a control member and actuating means therefor including a follower coacting with said cam, means for compounding the movement of said servo-motor with the movement of said first actuating member, and means for transmitting the compounded movement to said speed-changing device, said cam and the actuating means coacting therewith being adapted to hold said servo-motor control member in neutral position when said shafts are in one of said predetermined relative angular positions and said cam being so shaped that when turned in the direction corresponding to a lagging deviation of the shaft driven by the prime mover having said speed-changing device, it moves said control member to position to operate said servo-motor in the direction which will advance said speed-changing device, while a turning of said cam resulting from a leading of the shaft driven by the prime mover having said speed-changing device moves said control member to position to operate said servo-motor in the direction which will retard said speed-changing device.

8. A device as described in claim 1, wherein means are provided to limit the movement of said transmitting means in conformance with the range of movement of said speed-changing device, and a friction clutch is inserted in the line of mechanism connecting said shafts with said speed-changing device through said means comprising said first actuating device.

9. In a device for synchronizing power units each comprising a drive shaft operated by a separate prime mover, a driven shaft, and gearing connecting said shafts to run at different speeds, at least one of the prime movers having a speed-changing device; a phase indicator geared to corresponding shafts of both power units including an actuating member movable in accordance with the direction of any deviations of the instantaneous relative angular positions of said shafts from one or more predetermined relative angular positions; means controlled by said actuating member for shifting said speed-changing device in the proper direction to correct said deviation, and an indicating device geared to said phase indicator in such ratio as to give an indication at intervals corresponding to the number of revolutions of the shafts to which said phase indicator is geared required to bring said latter shafts from a given instantaneous angular position relative to the shafts to which they are connected by said gearing, back to the same relative angular position.

10. A device as described in claim 1, wherein a spring is provided to urge said transmitting means in one direction, in order to take up play.

WALTER BENZ.